United States Patent [19]
Konishi

[11] Patent Number: 5,737,528
[45] Date of Patent: Apr. 7, 1998

[54] NETWORK CONNECTING APPARATUS WITH SEPARATE DATA AND CONTROL SIGNAL LINES

[75] Inventor: Kuniyoshi Konishi, Tokyo, Japan

[73] Assignee: Kabushiki Kaisha Toshiba, Kawasaki, Japan

[21] Appl. No.: 792,071

[22] Filed: Feb. 10, 1997

Related U.S. Application Data

[63] Continuation of Ser. No. 275,414, Jul. 15, 1994, abandoned.

[30] Foreign Application Priority Data

Jul. 16, 1993 [JP] Japan .................................. 5-176536

[51] Int. Cl.$^6$ .................................................. G06F 13/14
[52] U.S. Cl. ........................... 395/200.12; 370/360
[58] Field of Search ........................... 395/200.02, 200.1, 395/200.12, 200.15, 200.2, 284, 287, 309, 311; 370/250, 351, 352, 357, 360, 389, 422; 340/825, 825.03, 826, 825.06

[56] References Cited

U.S. PATENT DOCUMENTS

| | | | |
|---|---|---|---|
| 4,991,172 | 2/1991 | Cidon et al. | 370/94.1 |
| 5,008,878 | 4/1991 | Ahmadi et al. | 370/60 |
| 5,014,262 | 5/1991 | Harshavarddhana | 370/16 |
| 5,088,091 | 2/1992 | Shroeder et al. | 370/94.3 |
| 5,345,229 | 9/1994 | Olnowich et al. | 340/825.8 |
| 5,390,173 | 2/1995 | Spinney et al. | 370/60 |
| 5,432,907 | 7/1995 | Picazo, Jr. et al. | 395/200.02 |
| 5,459,720 | 10/1995 | Iliev et al. | 370/60 |
| 5,473,604 | 12/1995 | Lorenz et al. | 370/60 |

Primary Examiner—Alpesh M. Shah
Attorney, Agent, or Firm—Oblon, Spivak, McClelland, Maier & Neustadt, P.C.

[57] ABSTRACT

A network connecting apparatus of this invention relates to a network connecting apparatus for connecting a plurality of networks to each other, including a plurality of network controllers, and a switch unit. A plurality of network controllers are respectively connected to the plurality of networks, each of which transmits and receives data between the network connected to itself and other networks. The switch unit connected to the plurality of network controllers, and has a network connection section for connecting at least two networks, and a switch control section for controlling the network connection section on the basis of connection requests from the plurality of network controllers to achieve a connection between desired networks.

11 Claims, 3 Drawing Sheets

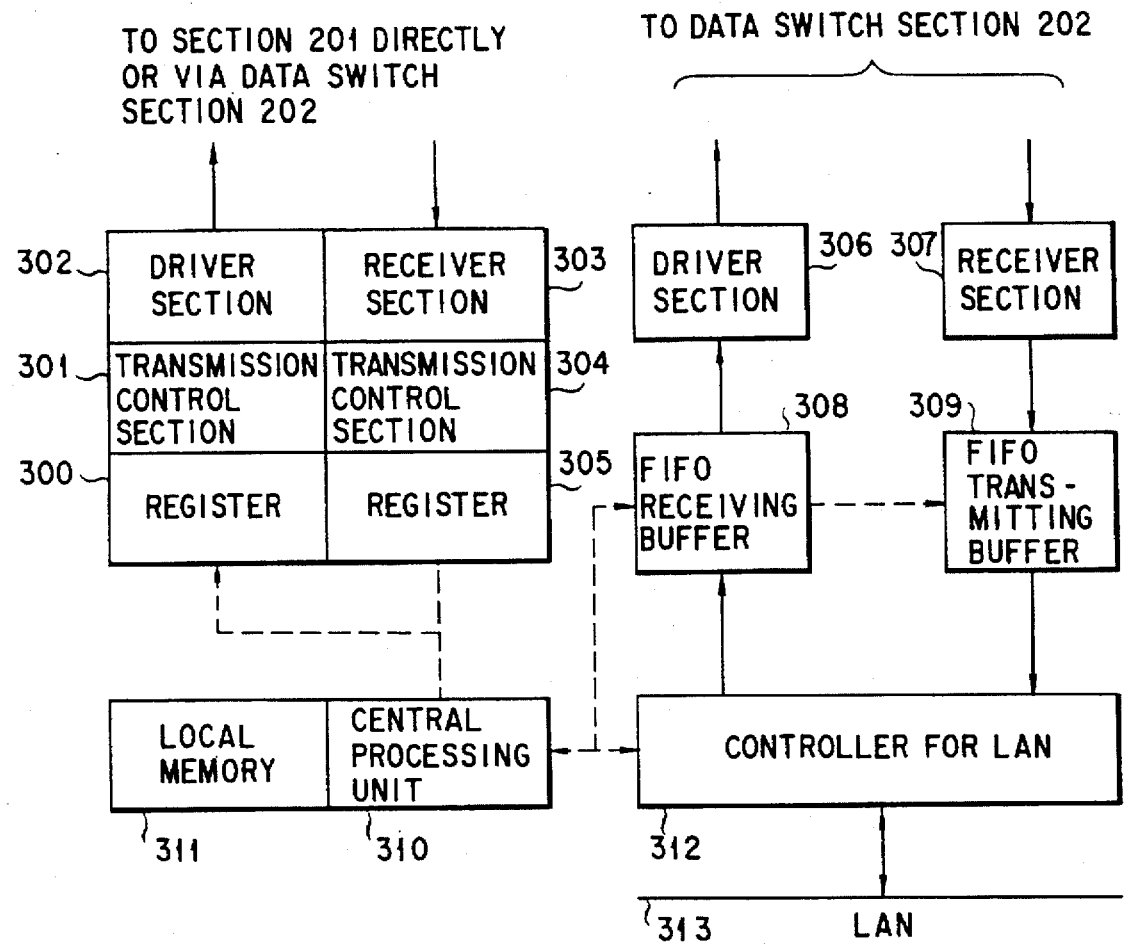
F I G. 3

NETWORK CONNECTING APPARATUS WITH SEPARATE DATA AND CONTROL SIGNAL LINES

This application is a Continuation of application Ser. No. 08/275,414, filed on Jul. 15, 1994, now abandoned.

BACKGROUND OF THE INVENTION

1. Field of the Invention

The present invention relates to the field of a network such as a high-speed LAN which is required to perform high-speed processing and, more particularly, to a network connecting apparatus for connecting a plurality of networks to each other.

2. Description of the Related Art

FIG. 1 shows an example of the arrangement of a LAN connecting apparatus which allows data transfer among a plurality of LANs.

A bus arbiter 100 performs control when LAN controllers (modules) 102 to 104 connected to a bus 101 use the bus. The bus 101 transfers data among the LAN controllers 102 to 104. The LAN controllers 102 to 104 are connected to the bus 101, respectively perform communications with corresponding LANs 105 to 107, and execute processing of the second and third layers such as a bridge function, a router function, and the like in the OSI reference model. Note that the LANs 105 to 107 may be WANs.

In recent years, demand has arisen for a high-performance LAN connecting apparatus. The conventional LAN connecting apparatus suffers the following problems.

(a) In order to realize a high-speed bus, the clock speed of the bus must be increased, and the bus width must also be increased. In design of a bus, performance in a maximum-scale arrangement of the LAN connecting apparatus must be taken into consideration. However, when the arrangement of the LAN connecting apparatus has a middle or small scale, the apparatus is wasteful in terms of cost, and another lower-level apparatus must be developed.

(b) In a simple bus system, a fault of a single module (LAN controller) influences the entire apparatus, and it is difficult in terms of techniques and cost to improve the fault tolerance. In particular, it is difficult in terms of cost to achieve a hot swap function while realizing high-speed processing.

SUMMARY OF THE INVENTION

It is an object of the present invention to provide a low-cost network connecting apparatus, for example, LAN connecting apparatus, which can efficiently achieve a middle-scale or small-scale arrangement, and can realize a function of preventing a fault of one network (LAN) controller from influencing the entire apparatus, and a hot swap function.

To achieve the above object, the network connecting apparatus according to the invention for connecting a plurality of networks to each other, is characterized by comprising: a plurality of network controllers, respectively connected to the plurality of networks, for transmitting/receiving data between the network connected to the self network controller and other networks; and a switch unit connected to the plurality of network controllers, and having a network connection section for connecting at least two networks, and a switch control section for controlling the network connection section on the basis of connection requests from the plurality of network controllers to achieve a connection between desired networks. The networks include LAN, WAN, or the like.

Each of the network controllers includes means for receiving data from the network connected to the self network controller; and means for checking a network as a transmission destination of the received data, and for, when the transmission destination is a network other than the network connected to the self network controller, outputting a connection request to the network controller of the transmission destination to the switch control section.

The switch control section includes means for, when the network controller of the transmission destination is ready to receive data, transmitting a transmission enable signal to the network controller of the transmission source on the basis of the connection request so as to establish a transmission path between the transmission source and the network controller of the transmission destination, and in the plurality of network controllers, the network controller of the transmission source includes means for transmitting the received data to the network controller of the transmission destination via the network connection section in response to the transmission enable signal, and the network controller of the transmission destination includes means for transmitting the transmitted data to the network connected to the self network controller.

The network connection section includes a crossbar switch.

Further, the switch control section further includes detection means, connected to the plurality of network controllers and the network connection section, for detecting status information of the plurality of network controllers and the network connection section; and status information transmission means, connected to the detection means, for transmitting the status information to the network via the corresponding network controller in response to a request from the network or the detection means.

The status information transmitting means includes means for switching a transmission path between the networks by controlling an ON/OFF state of the network connection section.

The method of connecting a plurality of networks via a network controller by switching a switch according to the invention in characterized by comprising the steps of: receiving data from the network connected to the self network controller, checking a destination of the received data, and requesting a connection to the network controller of the destination when the destination indicates another network; transmitting a transmission enable signal to a transmitting network controller in response to the connection request when a receiving network controller as the destination is ready to receive data, so as to establish a transmission path between the transmitting and receiving network controllers; and transmitting the data to the receiving network controller via the switch in response to the transmission enable signal.

Since the network connecting apparatus with the above-mentioned arrangement uses a crossbar switch as a data transmission path, performance in a maximum-scale arrangement of the data transmission path need not be considered in design unlike in a case using a bus. Furthermore, since the crossbar switch is divided into a control section and a switch section, a middle-scale or small-scale apparatus can be efficiently realized. Even when a network controller is disconnected from the crossbar switch unit, this does not influence other networks unlike in a case using a bus. Therefore, connection or disconnection in units of ports is facilitated. In particular, the reliability of the entire system upon swapping of the LAN controller with respect to the crossbar switch unit in a hot state can be remarkably improved. The use of a monitoring mechanism can further improve the fault tolerance.

Therefore, according to the present invention, an efficient network connecting apparatus which can facilitate connection/disconnection in units of ports, and has a high fault tolerance can be provided.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a block diagram showing the arrangement of a LAN controller shown in FIG. 2.

DETAILED DESCRIPTION OF THE PREFERRED EMBODIMENT

A LAN connecting apparatus according to an embodiment of the present invention will be described below with reference to the accompanying drawings.

Figure 2:
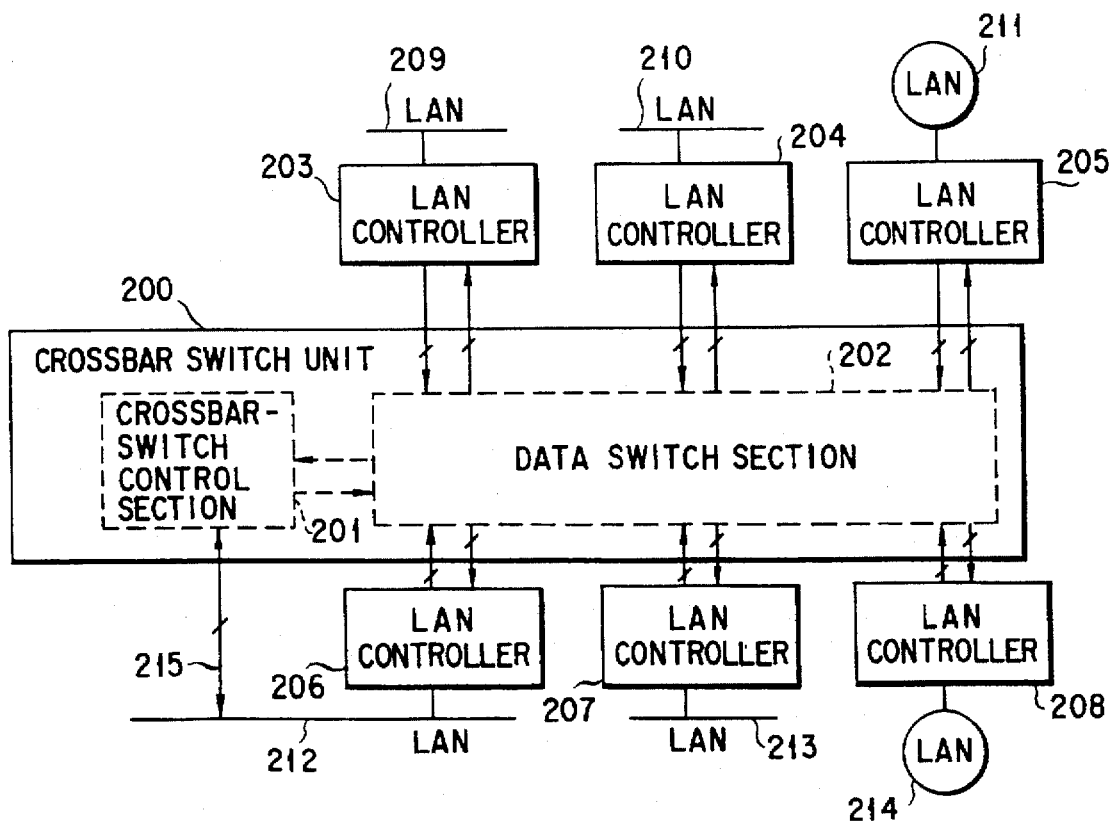
FIG. 2 is a block diagram showing the arrangement of a LAN connecting apparatus according to an embodiment of the present invention.

FIG. 2 shows the arrangement of the LAN connecting apparatus of this embodiment. Referring to FIG. 2, a crossbar switch unit 200 realizes a function of transmitting packets among LAN controllers (modules) 203 to 208 connected to the crossbar switch unit 200. The crossbar switch unit 200 comprises a crossbar switch control section 201 and a data switch section 202.

The crossbar switch control section 201 receives connection requests, status signals, and the like from the LAN controllers 203 to 208, and controls the connection state of the data switch section 202 to allow packet transmission among the LAN controllers 203 to 208.

The data switch section 202 includes a cross point switch array, and switches the data transmission path by switching the connection states of the switches, so as to allow data transmission among the LAN controllers 203 to 208.

The LAN controllers 203 to 208 are connected to the crossbar switch unit 200, perform communications with corresponding LANs 209 to 214, and execute processing of the second and third layers such as a bridge function, a router function, and the like in the OSI reference model. The LAN 212 and the crossbar switch control section 201 are connected via a monitoring line 215.

The arrangement of each of the LAN controllers 203 to 208 will be described below with reference to FIG. 3.

A register 300 stores a connection request flag to the crossbar switch section 200 and a status flag indicating a busy state, ready state, or the like of the LAN controller. The connection request flag and the status flag are set or reset by a central processing unit 310 (to be described later).

A transmission control section 301 has a function of parallel-to-serial converting an output signal from the register 300, and transmitting the converted signal.

A driver section 302 outputs the output signal from the transmission control section 301 to the crossbar switch control section 201 of the crossbar switch unit 200. Signal transmission from the driver section 302 to the crossbar switch control section 201 may be performed in direct via a exclusive line or may be performed via the data switch section 202 (without going through switches).

A receiver section 303 receives a connection enable flag signal supplied from the crossbar switch control section 201 of the crossbar switch unit 200. A signal from the crossbar switch unit 200 is a serial signal.

Signal transmission between the driver section 302 and the receiver section 303, and the crossbar switch control section 201 may be performed in direct via a exclusive line or may be performed via the data switch section 202 (without going through switches).

A transmission control section 304 converts the connection enable flag signal received by the receiver section 303 into a parallel signal.

A register 305 stores the parallel connection enable flag signal converted by the transmission control section 304. The flag storage register 305 is set/reset by the crossbar switch unit 200. The number of flags to be stored in the register 305 is the same as the number of the other party's ports.

A driver section 306 outputs a signal from a receiving buffer 308 to the crossbar switch unit 200.

A receiver section 307 receives a packet from the crossbar switch unit 200. Signals in the packet are transferred to a transmitting buffer 309.

The FIFO (First In First Out) receiving buffer 308 stores a set of a packet and its control information such as a packet size from a connected LAN 313.

The FIFO transmitting buffer 309 stores data from other LAN controllers connected to the crossbar switch unit 200. When the operation speed of the LAN 313 is lower than those of other ports, the buffer 309 is mounted to avoid a bottleneck. Therefore, the buffer 309 is not indispensable.

The central processing unit 310 executes a bridge function, a router function, and the like to control a controller 312 for LAN. The central processing unit 310 looks up the contents of the receiving and transmitting buffers 308 and 309, and controls communications with the crossbar switch unit 200 via the driver unit 306 and the receiver unit 307.

A local memory 311 of the central processing unit 310 holds data such as nonvolatile parameter values, and the like.

The controller 312 for LAN receives a packet from the LAN 313 on the basis of an instruction from the central processing unit 310, and stores the received packet in the receiving buffer 308. In addition, the controller 312 for LAN transmits a packet held in the transmitting buffer 309 onto the LAN 313. When the transmitting buffer 309 is not mounted, the controller 312 for LAN directly transmits a packet supplied from the FIFO receiving buffer 308 as a transmission source onto the LAN 313, and executes error control on the transmission path, and the like.

Figure 4:
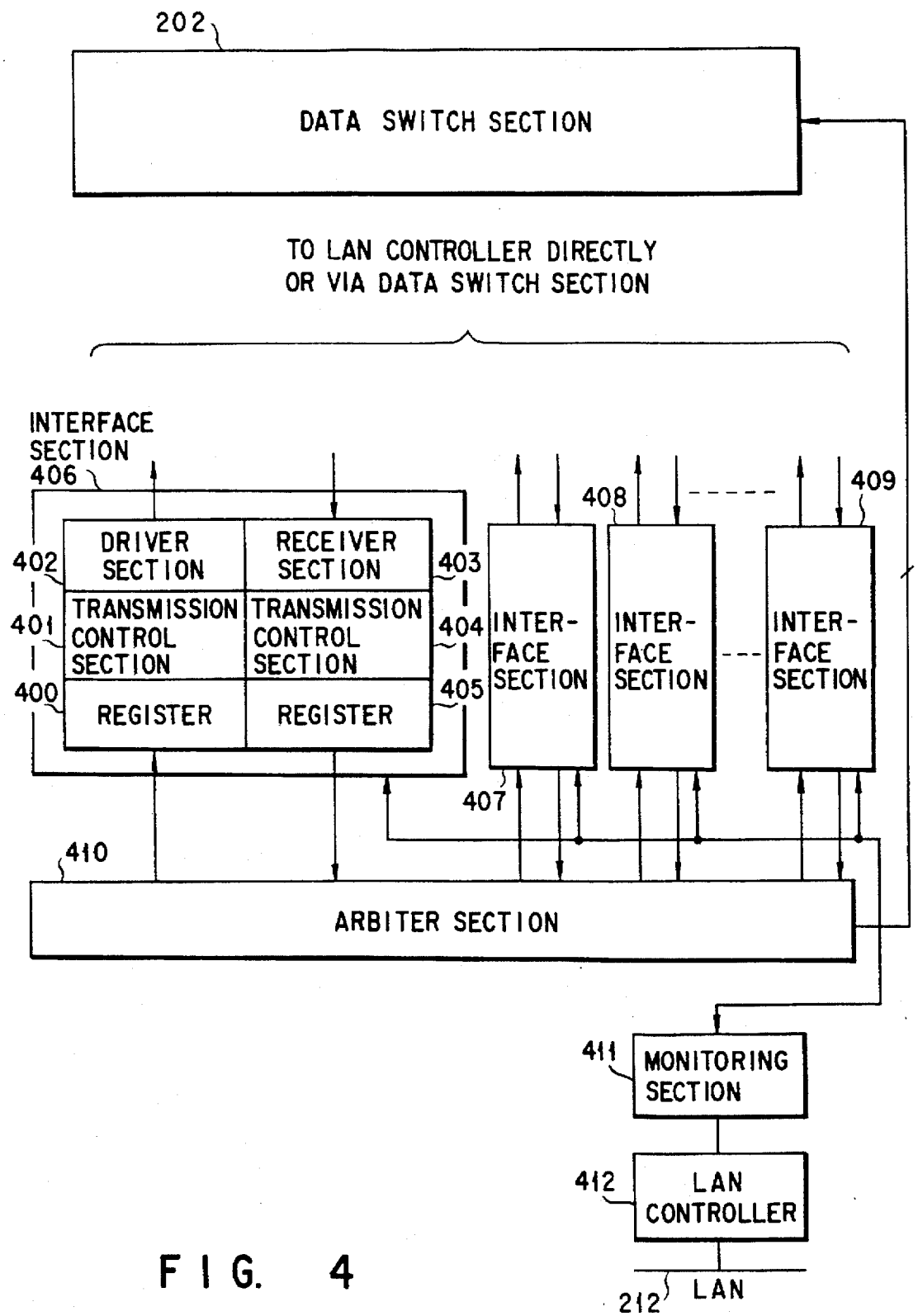
FIG. 4 block diagram showing the arrangement of a crossbar switch control section shown in FIG. 2.

FIG. 4 shows the arrangement of the crossbar switch control section 201.

A register 400 stores a connection enable flag to be transmitted to the LAN controller. An arbiter section 410 (to be described in detail later) sets/resets the connection enable flag. The number of connection enable flags is the same as the number of the other party's ports.

A transmission control section 401 parallel-to-serial converts data held in the register 400, and transmits the converted data.

A driver section 402 outputs an output signal from the transmission control section 401 to the corresponding LAN controller.

A receiver section 403 receives a connection request flag signal and a status flag signal from the LAN controller. These received signals are serial signals.

Signal transmission between the driver section 402 and the receiver section 403, and the corresponding LAN controller may be performed in direct via a exclusive line or may be performed via the data switch section 202 (without going through switches).

A transmission control section 404 converts the serial connection request flag signal and the serial status flag signal supplied from the LAN controller and received by the receiver section 403 into parallel signals.

A register 405 stores the connection request flag signal and the status flag signal supplied from the LAN controller. The flags are set/reset by the LAN controller. The number of flags is equal to the number of the other party's ports.

An interface section 406 is one for the LAN controller, and comprises the transmission control section 401, the driver section 402, the receiver section 403, the transmission control section 404, and the register 405.

Each of interface sections 407 to 409 has the same arrangement as that of the interface section 406. The crossbar switch control section 201 has interface sections corresponding to the number of the other party's ports.

The arbiter section 410 arbitrates the connection request flag signals from the LAN controllers with reference to the status flags, and outputs connection enable flags to the corresponding LAN controllers. The arbiter section 410 controls the ON/OFF states of the switches in the data switch section 202 to allow data transmission among the LAN controllers, thereby switching the data transmission paths.

A monitoring section 411 comprises a microcomputer, and the like, monitors the states of the interface sections 406 to 409 and the arbiter section 410, and is connected to the LAN 212 via a LAN controller 412. For example, the monitoring section 411 checks the contents of the registers 400 and 405 in the interface sections 406 to 409 all the time, or periodically, or when requested. More specifically, the monitoring section 411 checks if a status flag indicating a busy state is always set in the register 405 of the interface section 406. In this case, it is considered that the corresponding LAN controller is abnormal. Furthermore, the monitoring section 411 discriminates if the number of connection requests to the LAN controller 212 is extremely large. This can be discriminated by checking a queue of connection requests in the arbiter section 410.

The operation of the network connecting apparatus according to the present invention with the above-mentioned arrangement will be described below.

The operation of the entire system will be briefly described below with reference to FIG. 2.

In the following description, the LAN 209 is assumed to be a transmission source LAN, and the LAN 214 is assumed to be a transmission destination LAN, for the sake of simplicity.

The LAN controller 203 checks the destination address included in a packet received from the connected LAN 209. If the LAN controller 203 detects that it must transmit the received packet to another LAN controller 208 (i.e., the LAN 214), it sets a connection request flag corresponding to the port of the LAN controller to be connected (i.e., the LAN controller 208) in the crossbar switch unit 200.

The crossbar switch unit 200 arbitrates the connection request from the LAN controller 203, and outputs a connection enable signal (ready signal) to the LAN controller 203 which issued the connection request, and at the same time, it switches the data path in the data switch section 202. Alternatively, the crossbar switch unit 200 outputs a connection disable signal (busy signal).

Upon reception of the connection enable signal, the LAN controller 203 transmits the packet to the LAN controller 208 as the transmission destination via the data switch section 202. Upon completion of transmission, the LAN controller 203 resets the connection request flag.

The LAN controller 208 which received the packet from the crossbar switch unit 200 transmits the received packet to the connected LAN 214.

The operation of each LAN controller will be described below with reference to FIG. 3. In this case, since the operations of the LAN controllers are the same, the operation of one LAN controller will be explained below.

The operation of the transmitting LAN controller will be described below.

Upon reception of a packet from the LAN 313, the controller 312 for LAN stores the packet in the receiving buffer 308 under the control of the central processing unit 310. The central processing unit 310 executes a bridge function, a router function, and the like for the received packet.

The central processing unit 310 checks the destination address included in the received packet. If the destination is another LAN, the central processing unit 310 sets a flag corresponding to the other party's port in the register 300 so as to issue a connection request to the other party's port.

The transmission control section 301 parallel-to-serial converts the output signal from the register 300, and supplies serial signals to the driver section 302. The driver section 302 transmits the output signal from the register 300, which signal is converted into serial data, to the crossbar switch control section 201 in the crossbar switch unit 200.

When a connection is permitted, the crossbar switch control section 201 supplies a connection enable flag signal to the receiver section 303. Upon reception of the connection enable flag signal, the receiver section 303 supplies the received signal to the transmission control section 304. The transmission control section 304 converts the connection enable flag signal into a serial signal, and sets the serial flag signal in the register 305.

The central processing unit 310 detects on the basis of the flag set in the register 305 that the connection is permitted, and controls the FIFO receiving buffer 308 to transmit the received packet to the other party's LAN controller via the driver section 306 and the data switch section 202. Upon completion of the transmission, the central processing unit 310 resets the connection request flag.

The operation of the receiving LAN controller will be described below.

Upon reception of a packet, the receiver section 307 of the receiving LAN controller supplies the received packet to the FIFO transmitting buffer 309. The controller 312 for LAN transmits data in the transmitting buffer 309 as a packet onto the LAN 313.

While the controller 312 for LAN is transmitting a packet onto the LAN 313, the central processing unit 310 sets a busy flag as a status flag in the register 300, and sends it to the crossbar switch unit 200. The controller 312 for LAN also executes error control on the transmission path, and the like.

The operation of the crossbar switch control section 201 will be described below with reference to FIG. 4.

When a given LAN controller outputs a connection request (from its driver section 402), this request is received by the receiver section 403 of the corresponding interface section, e.g., the interface section 406. The received request is converted into parallel data by the transmission control section 404, and the parallel data are set in the register 405.

The arbiter section 410 arbitrates the connection request flag signals from the LAN controllers with reference to status flags set in the register 405, and outputs connection enable flags to the LAN controllers via the register 400, the transmission control section 401, and the driver section 402. This flag is received by the receiver section 303 of each LAN controller. At the same time, the arbiter section 410 switches the data path of the data switch section 202.

When a monitoring request is supplied from a terminal connected to the LAN 212 to the monitoring section 411 via the LAN 212, the line 215, and the LAN controller 412, the monitoring section 411 provides monitoring information to the terminal via the line 215 and the LAN 212. A monitoring request from a terminal connected to the LAN other than the LAN 212 is supplied to the LAN 212 via the crossbar switch unit 200, and is then supplied from the LAN 212 to the monitoring section 411 via the line 215 and the LAN controller 412. Monitoring information from the monitoring section 411 is transmitted to the corresponding LAN via the LAN controller 412, the line 215, the LAN 212, and the crossbar switch unit 200.

The operation of the entire system upon transfer of a packet from the LAN 213 to the LAN 210 will be described in detail below with reference to FIGS. 2 to 4.

Upon reception of a packet from the LAN 213, the controller 312 for LAN of the LAN controller 207 connected to the LAN 213 sets the received packet in the FIFO receiving buffer 308 under the control of the central processing unit 310.

The central processing unit 310 checks the destination address included in the packet received from the LAN 213, and detects that the packet must be transmitted to the LAN controller 204. Then, the central processing unit 310 sets a connection request flag for requesting data transmission to the LAN controller 204 in the register 300.

The transmission control section 301 parallel-to-serial converts the connection request set in the register 300, and supplies the converted data to the driver section 302. The driver section 302 transmits the output signal from the register 300, which is converted into serial data, to the interface section, corresponding to the LAN controller 207, in the crossbar switch control section 201.

The output from the driver section 302 is received by the receiver section 403, and is converted into parallel data by the transmission control section 404. The parallel data are set in the register 405, and are supplied to the arbiter section 410.

The arbiter section 410 discriminates that the data transfer destination is the LAN controller 204, and checks a status signal set in the register 405 of the interface section corresponding to the LAN controller 204. If the arbiter section 410 determines that the LAN controller 204 is ready, it sets a flag indicating a ready (transmission enable) state in the register 400, and controls the data switch section 202 to establish a data path between the LAN controllers 207 and 204.

On the other hand, if the arbiter section 410 determines that the LAN controller 204 is busy, it sets a flag indicating a busy (transmission disable) state in the register 400, and sets the request in the queue of the connection requests. In this case, the data switch section 202 is controlled after the corresponding LAN controller becomes ready.

The flag indicating the ready or busy state and set in the register 400 is converted into serial data by the transmission control section 401, and the driver section 402 transmits the serial data to the receiver section 303 of the LAN controller 207.

The receiver section 303 supplies the received flag to the transmission control section 304. The transmission control section 304 converts the received flag into parallel signals, and sets the converted signals in the register 305.

The central processing unit 310, if the flag set in the register 305 is a ready flag, controls the driver section 306 to transmit the packet held in the receiving buffer 308 to the LAN controller 204 via the data switch section 202. Upon completion of the transmission, the central processing unit 310 resets the connection request flag.

The receiver section 307 of the LAN controller 204 receives the packet from the LAN controller 207, and supplies the received packet to the FIFO transmitting buffer 309. The controller 312 for LAN transmits data in the FIFO transmitting buffer 309 as a packet onto the LAN 210.

While the controller 312 for LAN is transmitting the packet onto the LAN 313, the central processing unit 310 sets a busy flag as a status flag in the register 300, and supplies it to the crossbar switch unit 200. The controller 312 for LAN also executes error control on the transmission path, and the like.

Figure 1:
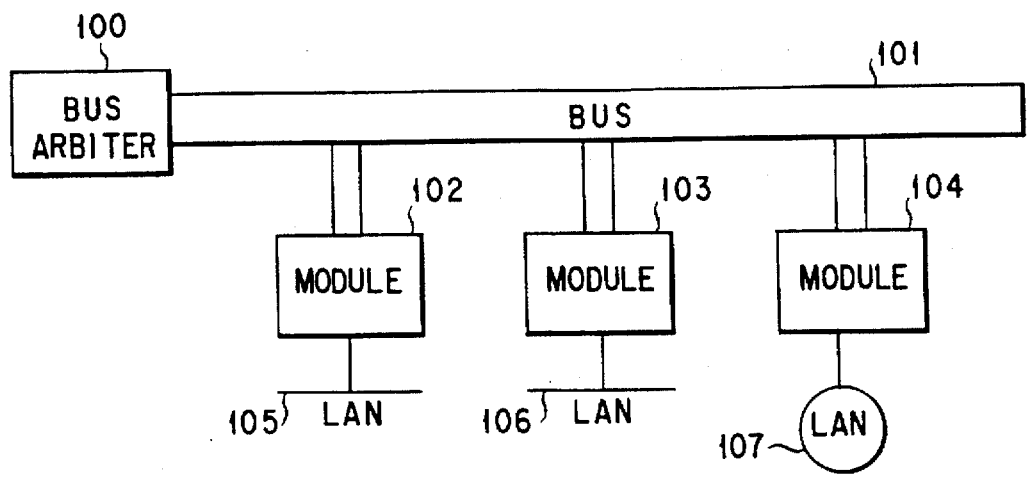
FIG. 1 is a block diagram showing the arrangement of a conventional LAN connecting apparatus.

Assume that the connection between the crossbar switch unit 200 and the LAN controller 207 is disconnected during data transmission between the LANs 210 and 213. In this case, in this embodiment, since the data transmission path is constituted by the crossbar switch unit 200, the disconnection can be prevented from influencing the other LAN controllers 203, 205, 206, and 208. Therefore, according to the present invention, reliability for a hot swap function can be improved as compared to the bus type conventional LAN connection apparatus shown in FIG. 1.

The monitoring operation will be described below with reference to FIGS. 2 to 4.

The monitoring section 411 monitors the states of the interface sections 406 to 409 and the arbiter section 410, and stores status data in its internal memory.

When a terminal connected to the LAN 212 supplies a monitoring request to the monitoring section 411 via the LAN 212, the line 215, and the LAN controller 412, the monitoring section 411 provides monitoring information to the terminal via the LAN controller 412, the line 215, and the LAN 212.

Upon detection of a serious abnormality or fault, the monitoring section 411 provides information indicating this to a terminal via the LAN controller 412, the line 215, and the LAN 212, thus informing the abnormality.

For example, a monitoring request from a terminal connected to the LAN 214 is supplied to the LAN 212 via the LAN controller 208 and the crossbar switch unit 200, and is then supplied form the LAN 212 to the monitoring section 411 via the line 215 and the LAN controller 412. Monitoring information from the monitoring section 411 is transmitted to the corresponding terminal via the LAN controller 412, the line 215, the LAN 212, the crossbar switch unit 200, the LAN controller 208, and the LAN 214.

The present invention is not limited to the above embodiment.

In this embodiment, a case has been exemplified wherein LANs are connected via the crossbar switch. However, the present invention can be applied to a case wherein WANs or LANs and WANs are connected to each other. That is, the present invention can be widely applied to other networks.

Furthermore, in the above embodiment, connections are switched and selectively used by the crossbar switch. However, the present invention is not limited to this, and may be applied to any other switches which allow hot swapping of LAN controllers.

According to the LAN connecting apparatus of the above embodiment, since the crossbar switch is used as the data transmission path, performance in a maximum-scale arrangement of the data transmission path need not be considered in design unlike in a case using a bus, and a middle-scale or small-scale apparatus can be efficiently realized. Even when the LAN controller is disconnected from the data transmission path, the disconnection does not influence other controllers unlike in a case using a bus. Therefore, connection/disconnection in units of ports is facilitated, and the fault tolerance can be improved. In particular, the reliability of the entire system upon hot swapping of the LAN controller from the crossbar switch unit can be remarkably improved. In addition, the fault tolerance can be further improved by the use of a monitoring mechanism.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A network connecting apparatus for connecting a plurality of networks to each other, comprising:

a plurality of network controllers, respectively connected to said plurality of networks, for transmitting/receiving data between the network connected to the self network controller and other networks, each of the plurality of network controllers receiving a control signal and data in serial and outputting the control signal and data over separate lines in parallel; and a switch unit connected to said plurality of network controllers, and having a network connection section for connecting at least two networks, and a switch control section for controlling said network connection section on the basis of connection requests from said plurality of network controllers to achieve a connection between desired networks, wherein each of said plurality of network controllers outputs in parallel the data and the control signal to said network connection section and said switch control section, respectively.

2. An apparatus according to claim 1, wherein said network connection section includes a crossbar switch.

3. An apparatus according to claim 1, wherein each of said network controllers includes:

means for receiving data from the network connected to the self network controller; and means for checking a network as a transmission destination of the received data, and for, when the transmission destination is a network other than the network connected to the self network controller, outputting a connection request to the network controller of the transmission destination to said switch control section.

4. An apparatus according to claim 3, wherein said network connection section includes a crossbar switch.

5. An apparatus according to claim 3, wherein said switch control section includes means for, when the network controller of the transmission destination is ready to receive data, transmitting a transmission enable signal to the network controller of the transmission source on the basis of the connection request so as to establish a transmission path between the transmission source and the network controller of the transmission destination, and in said plurality of network controllers, said network controller of the transmission source includes means for transmitting the received data to the network controller of the transmission destination via said network connection section in response to the transmission enable signal, and said network controller of the transmission destination includes means for transmitting the transmitted data to the network connected to the self network controller.

6. An apparatus according to claim 5, wherein said network connection section includes a crossbar switch.

7. An apparatus according to claim 1, wherein said switch control section includes:

detection means, connected to said plurality of network controllers and said network connection section, for detecting status information of said plurality of network controllers and said network connection section; and status information transmission means, connected to said detection means, for transmitting the status information to the network via the corresponding network controller in response to a request from the network or said detection means.

8. An apparatus according to claim 7, wherein said status information transmission means includes means for switching a transmission path between the networks by controlling an ON/OFF state of said network connection section.

9. A network connecting apparatus according to claim 1, wherein:

one of said plurality of network controllers which receives the communication signal and the control data in parallel outputs the control data and communication signal in serial to one of the plurality of networks connected thereto.

10. A method of connecting a plurality of networks via a network controller by switching a switch unit which includes a switch section and a switch control section, comprising the steps of:

receiving data and a control signal serially from the network connected to the self network controller, checking a destination of the received data by examining the control signal, and requesting a connection to the network controller of the destination when the destination indicates another network;

transmitting a transmission enable signal to a transmitting network controller in response to the connection request when a receiving network controller as the destination is ready to receive data, so as to establish a transmission path between the transmitting and receiving network controllers; and transmitting the data to the receiving network controller via the switch unit in response to the transmission enable signal, wherein said transmitting step includes a substep of outputting a transmission enable control signal and transmission data to the switch control section and the switch section, respectively, from the self network controller in parallel over different communication lines.

11. A method according to claim 10, comprising the step of:

outputting, by the receiving network controller, the control signal and the data in serial.

* * * * *